US011994267B2

(12) United States Patent
Mochizuki et al.

(10) Patent No.: US 11,994,267 B2
(45) Date of Patent: May 28, 2024

(54) VEHICLE LAMP

(71) Applicant: KOITO MANUFACTURING CO., LTD., Tokyo (JP)

(72) Inventors: Kazuma Mochizuki, Shizuoka (JP); Teppei Muramatsu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/012,196

(22) PCT Filed: Jun. 23, 2021

(86) PCT No.: PCT/JP2021/023845
§ 371 (c)(1),
(2) Date: Dec. 21, 2022

(87) PCT Pub. No.: WO2022/009683
PCT Pub. Date: Jan. 13, 2022

(65) Prior Publication Data

US 2023/0272898 A1 Aug. 31, 2023

(30) Foreign Application Priority Data

Jul. 6, 2020 (JP) ................................ 2020-116346

(51) Int. Cl.

| | |
|---|---|
| ***F21S 45/435*** | (2018.01) |
| ***F21S 41/147*** | (2018.01) |
| ***F21S 41/20*** | (2018.01) |
| ***F21S 41/27*** | (2018.01) |
| ***F21S 41/32*** | (2018.01) |
| ***F21S 45/47*** | (2018.01) |

(52) U.S. Cl.
CPC .......... *F21S 45/435* (2018.01); *F21S 41/147* (2018.01); *F21S 41/27* (2018.01); *F21S 41/285* (2018.01); *F21S 41/32* (2018.01); *F21S 45/47* (2018.01)

(58) Field of Classification Search
CPC ........ F21S 45/435; F21S 45/47; F21S 41/147; F21S 41/27; F21S 41/285; F21S 41/32
USPC .......................................................... 362/547
See application file for complete search history.

(56) References Cited

U.S. PATENT DOCUMENTS

2016/0363283 A1* 12/2016 Yamamoto ............ F21S 41/148

FOREIGN PATENT DOCUMENTS

| | | |
|---|---|---|
| JP | 2017-091848 A | 5/2017 |
| JP | 2020-095878 A | 6/2020 |
| WO | 2019/176869 A1 | 9/2019 |

OTHER PUBLICATIONS

International Search Report dated Jul. 27, 2021 for WO 2022/009683 A1 (4 pages).

* cited by examiner

*Primary Examiner* — Laura K Tso
(74) *Attorney, Agent, or Firm* — Venjuris, P.C.

(57) ABSTRACT

A vehicle lamp includes: a circuit board on which a light source is mounted; a heat sink having a front surface or a rear surface to which the circuit board is attached and configured to release heat generated when the light source is driven; and a cooling fan disposed above or below the circuit board and the heat sink. Cooling air generated by the cooling fan flows along the heat sink and the light source.

7 Claims, 5 Drawing Sheets

VEHICLE LAMP

CROSS REFERENCE TO RELATED APPLICATIONS

This application is a national phase of PCT application No. PCT/JP2021/023845, filed on 23 Jun. 2021, which claims priority from Japanese patent application No. 2020-116346, filed on 6 Jul. 2020, all of which are incorporated herein by reference.

TECHNICAL FIELD

The present disclosure relates to a technical field relating to a vehicle lamp including heat sink that releases heat generated when a light source is driven and a cooling fan that generates cooling air.

BACKGROUND

There is a vehicle lamp in which, for example, a heat sink that releases heat generated when a light source is driven and a cooling fan that generates cooling air are disposed inside a lamp outer housing constituted by a cover and a lamp housing, and the temperature rise of the light source is suppressed so that a good driving state of the light source is secured (see, e.g., Patent Document 1).

In the vehicle lamp disclosed in Patent Document 1, a circuit board to which the light source is mounted is attached to the front surface of the heat sink, the cooling fan is disposed on the rear surface side of the heat sink, and the cooling fan is rotated when the light source is driven.

Cooling air is generated by the cooling fan, and the generated cooling air is directed forward and a part of the cooling air passes through a ventilation flow path formed below the heat sink and flows around the front surface side of the heat sink. The cooling air directed forward is blown to the heat sink, and the cooling air passing through the ventilation flow path and flowing around the front surface side of the heat sink flows upward and flows along the light source. Therefore, the cooling performance for the light source may be improved by the cooling air blown to the heat sink and the cooling air flowing along the light source.

PRIOR ART DOCUMENT

Patent Document

Patent Document 1: Japanese Patent Laid-Open Publication No. 2017-091848

SUMMARY OF THE INVENTION

Problem to be Solved

However, in the vehicle lamp disclosed in Patent Document 1, since a part of the cooling air flows toward the light source after flowing through the ventilation flow path along the lower surface of the heat sink, the temperature of the cooling air is risen when flowing through the ventilation flow path, and thus, sufficient cooling performance for the light source may not be secured.

Further, in the vehicle lamp, each of necessary parts such as a projection lens, a lens holder, a circuit board, and a heat sink is often arranged side by side in the front-rear direction (optical axis direction), and the size in the front-rear direction is likely to be large, and thus, miniaturization in the front-rear direction is often required.

Therefore, the vehicle lamp according to the present disclosure is to promote the miniaturization in the front-rear direction, and then, to improve the cooling performance for the light source.

Means to Solve the Problem

Firstly, the vehicle lamp according to the present disclosure includes: a circuit board on which a light source is mounted; a heat sink that has a front surface or a rear surface to which the circuit board is attached and releases heat generated when the light source is driven; and a cooling fan disposed above or below the circuit board and the heat sink. Cooling air generated by the cooling fan flows along the heat sink and the light source.

Therefore, the cooling air generated by the cooling fan disposed above or below the circuit board and the heat sink flows along the heat sink and the circuit board attached to the front surface or the rear surface of the heat sink.

Secondly, in the vehicle lamp according to the present disclosure, the cooling fan may be provided with a rotation shaft and a plurality of wings, and the rotation shaft may be positioned closer to the heat sink than the light source in the front-rear direction.

Therefore, since the wings are positioned above or below the light source, the amount of the cooling air flowing along the light source increases.

Thirdly, in the vehicle lamp according to the present disclosure, a reflector may be provided to reflect light emitted from the light source, the reflector may include an intake opening that is positioned below or above the cooling fan and takes in the cooling air generated by the cooling fan, and the cooling air taken in from the intake opening may flow toward the light source.

Therefore, since the cooling air generated by the cooling fan is taken in from the intake opening formed in the reflector and directed to the light source, it is not necessary to provide a dedicated member separate from the reflector for flowing the cooling air toward the light source.

Fourthly, in the vehicle lamp according to the present disclosure, the reflector may have a guiding inclined surface that guides the cooling air taken in from the intake opening, and the guiding inclined surface may be inclined to be closer to the light source as a distance from the cooling fan in a vertical direction increases.

Therefore, since the cooling air generated by the cooling fan is induced to the guiding inclined surface and directed toward the light source, the cooling air flows intensively along the light source.

Fifthly, in the vehicle lamp according to the present disclosure, the reflector may be made of a metal material and may be attached to the heat sink.

Therefore, the heat generated when the light source is driven is transferred to both the heat sink and the reflector.

Sixthly, in the vehicle lamp according to the present disclosure, the surface of the circuit board on which the light source is mounted may be formed as a light source mounting surface, and the circuit board may be disposed in a state where the light source mounting surface is inclined in a direction toward the cooling fan with respect to the vertical direction.

Therefore, it becomes easier for the cooling air generated by the cooling fan to flow along the light source.

Seventhly, in the vehicle lamp according to the present disclosure, a projection lens that controls the light emitted from the light source and a protector including a light shielding portion that shields sunlight incident through the projection lens may be provided, and the light shielding portion may be provided as a guiding portion that guides the cooling air toward the projection lens.

Therefore, the cooling air is guided toward the projection lens by the shielding portion of the protector.

Effect of the Invention

According to the present disclosure, since the cooling air generated by the cooling fan disposed above or below the circuit board and the heat sink flows along the heat sink and the circuit board attached to the front surface or the rear surface of the heat sink, it is possible to promote the miniaturization in the front-rear direction, and then to improve the cooling performance for the light source.

DETAILED DESCRIPTION TO EXECUTE THE INVENTION

Hereinafter, an embodiment for implementing a vehicle lamp of the present disclosure will be described with reference to the accompanying drawings.

The vehicle lamp 1 is, for example, a vehicle headlamp, and is disposed on left and right ends of the front end portion of a vehicle.

Figure 1:
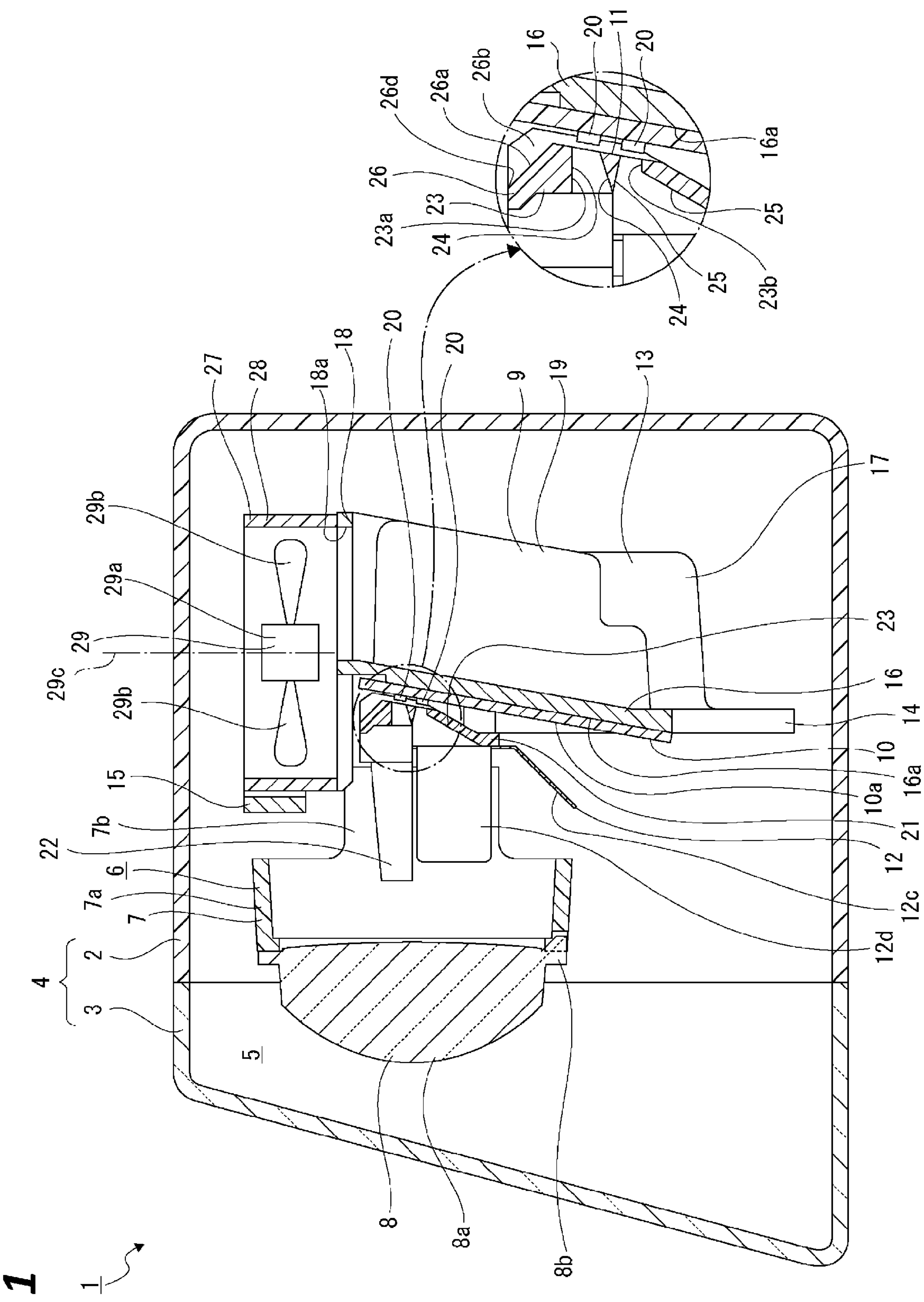
FIG. 1 illustrates an embodiment of a vehicle lamp of the present disclosure together with FIGS. 2 to 5, and is a cross-sectional view of the vehicle lamp.

The vehicle lamp 1 includes a lamp housing 2 that is opened at the front end and a cover 3 that closes an opening of the lamp housing 2 (see FIG. 1). A lamp outer housing 4 is constituted by the lamp housing 2 and the cover 3, and the internal space of the lamp outer housing 4 is formed as a lamp chamber 5.

A lamp unit 6 is disposed in the lamp chamber 5. The lamp unit 6 includes a lens holder 7, a projection lens 8, a heat sink 9, a circuit board 10, a reflector 11, and a protector 12 (see FIGS. 1 and 2).

The lamp unit 6 is supported by the lamp housing 2 via an optical axis adjusting mechanism (not illustrated). Therefore, it is possible to adjust (aiming adjustment or leveling adjustment) the optical axis of light by operating the optical axis adjusting mechanism to move the lamp unit 6 in the vertical direction or the left-right direction with respect to the lamp housing 2.

The lens holder 7 includes a holding tubular portion **7*a* having an axial direction directed in the front-rear direction and having a substantially cylindrical shape and leg portions 7*b* and 7*b* each protruding rearward from the holding tubular portion 7*a***.

The projection lens 8 is held by the holding tubular portion **7*a* of the lens holder 7. The projection lens 8 is constituted by integrally forming a lens main body 8*a* through which light is transmitted and an attached portion 8*b* having a flange shape and projecting outward from a rear end portion of the lens main body 8*a*. In the projection lens 8, the attached portion 8*b* is attached to the holding tubular portion 7*a* from the front side to be held by the lens holder 7**.

For example, the projection lens 8 is made of acrylic by injection molding. Acrylic, together with polycarbonate, is a very suitable material for molding a resin part by injection molding, and is a material with higher transparency and better moldability than polycarbonate, but is known to have lower heat resistance than polycarbonate.

For that reason, the projection lens 8 is held by the lens holder 7 in a state where a lower end portion of the attached portion **8*b*** becomes a gate position. By positioning the gate position where the residual strain may remain at the lowest side, the portion where the residual strain may remain is less likely to be affected by heat compared to a case where the gate position is positioned at an upper side, and thus, it is possible to suppress the deformation of the portion where the gate position is located.

In the heat sink 9, a heat radiating portion 13, attaching portions 14 and 14, and a bridge portion 15 are made of a metal material with high thermal conductivity.

The heat radiating portion 13 includes a front surface portion 16, side surface portions 17 and 17, an upper surface portion 18, and fin portions 19, 19, . . . . The front surface portion 16 is inclined rearwardly downward with respect to the vertical direction, and a front surface **16*a* is formed as a board attaching surface. The side surface portions 17 and 17 protrude rearward from both left and right end portions of the front surface portion 16. The upper surface portion 18 protrudes rearward from an upper end portion of the front surface portion 16, and both left and right end portions thereof are continued with an upper end portion of each of the side surface portions 17 and 17. An introducing hole 18*a* is formed in the upper surface portion 18 except for the outer periphery portion. The fin portions 19, 19, . . . protrude rearward from the front surface portion 16, and are positioned to be spaced apart laterally between the side surface portions 17 and 17**.

The attaching portions 14 and 14 protrude from the outer side in the lateral direction from both left and right end portions of the front surface portion 16 to positions spanning to the lower side. The leg portions **7*b* and 7*b* of the lens holder 7 are attached to the attaching portions 14 and 14**, respectively, from the front side, for example, by screwing.

The bridge portion 15 is provided as a portion connecting the upper end portion of the attaching portions 14 and 14. The strength of the heat sink 9 is increased by the bridge portion 15.

The circuit board 10 faces substantially in the front-rear direction, includes a front surface formed as a light source mounting surface **10*a*, and is attached to the front surface 16*a* of the front surface portion 16. Therefore, the circuit board 10 is inclined rearwardly downward with respect to the vertical direction according to the inclination state of the front surface portion 16, and the light source mounting surface 10*a*** is disposed in a state of being directed slightly upward with respect to the front.

Light sources 20, 20, . . . are mounted on the light source mounting surface **10*a* of the circuit board 10 at positions near the upper end. As the light source 20, for example, a light emitting diode (LED) is used. A plurality of light sources 20, 20, . . . is arranged laterally in, for example, upper and lower stages. The light sources 20, 20, . . . arranged on the upper side are, for example, for low beam, and the light sources 20, 20**, . . . arranged on the lower side are, for example, for high beam.

Meanwhile, in the vehicle lamp 1, a light distribution variable control that turns on/off the light sources 20, 20, . . . individually depending on the traveling state of the vehicle or the surrounding environment is performed, so that dazzling light to drivers of oncoming vehicles or preceding vehicles or pedestrians is not generated.

Figure 3:
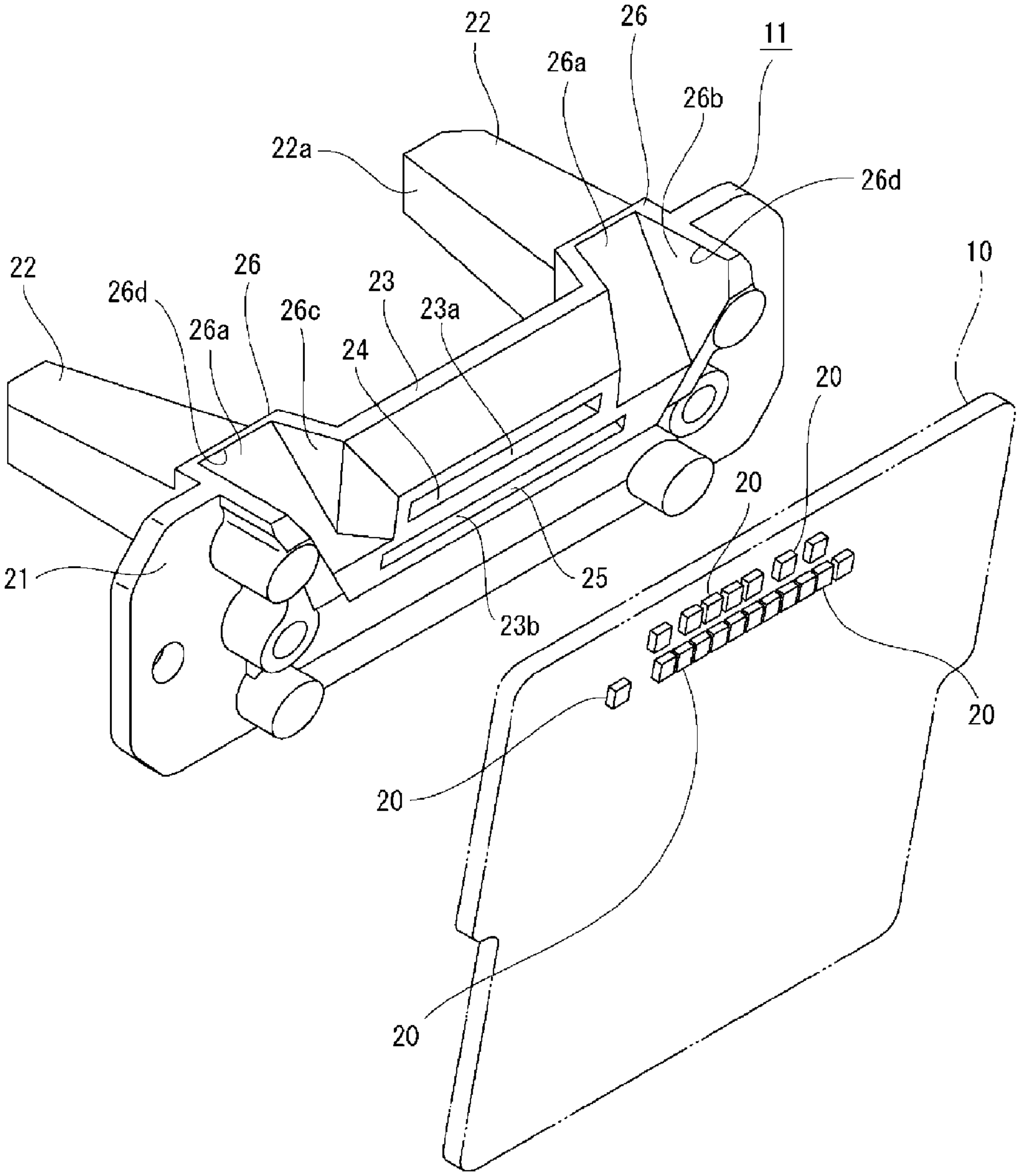
FIG. 3 is a perspective view illustrating a reflector and a circuit board.
Figure 4:
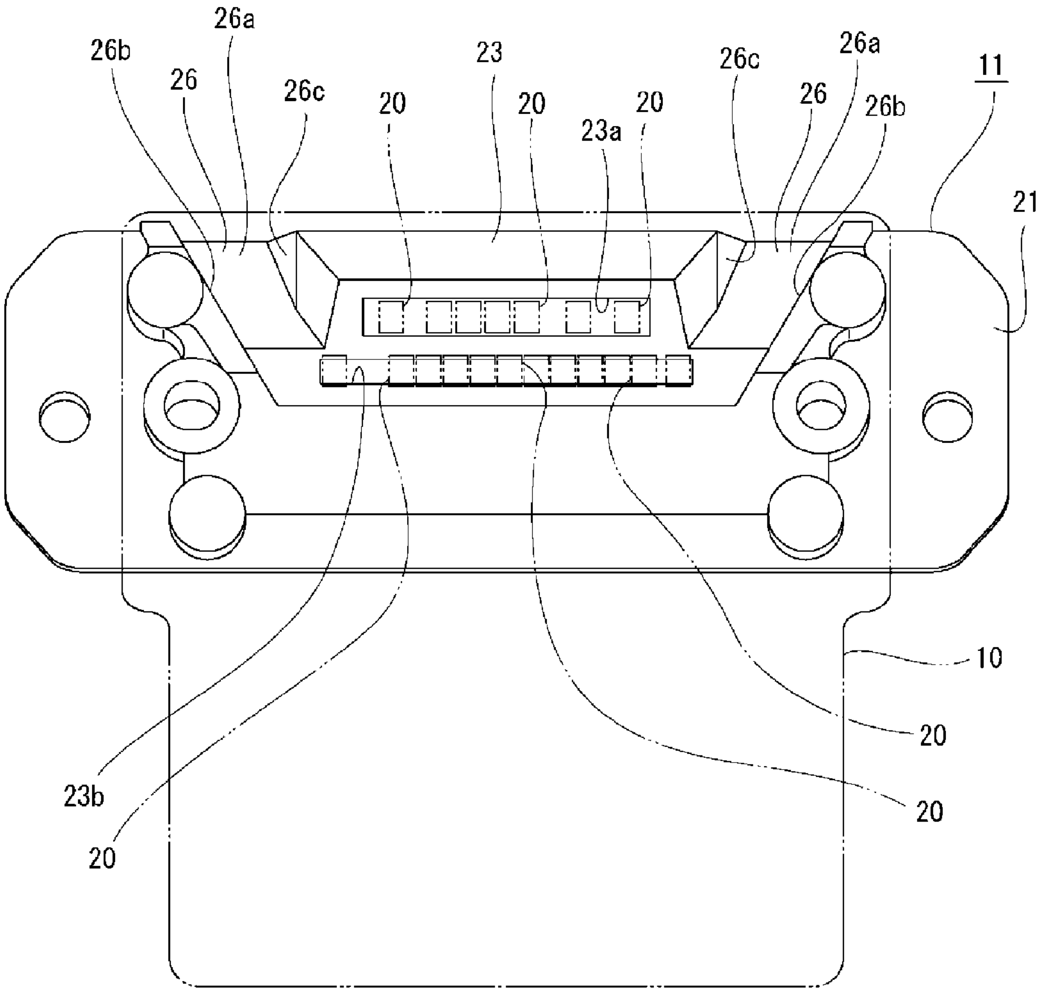
FIG. 4 is a rear view illustrating the reflector and the circuit board.

The reflector 11 is made of a metal material such as aluminum, which has high thermal conductivity. The reflector 11 includes a base surface portion 21 directed in the front-rear direction and horizontally long, reflecting protrusions 22 and 22 protruding from positions near both left and right ends of an upper end portion of the base surface portion 21, and a reflection portion 23 positioned between the reflecting protrusions 22 and 22 (see FIGS. 2 to 4).

The surfaces of the reflecting protrusions 22 and 22 facing each other are formed as side reflection surfaces 22*a* and 22*a*, respectively.

The reflection portion 23 includes a first passage hole 23*a* and a second passage hole 23*b* that are horizontally long and spaced apart from each other in the vertical direction. Upper and lower wall surfaces of the reflection portion 23 that form the first passage hole 23*a* are formed as first reflection surfaces 24 and 24, respectively, and upper wall surface and lower wall surface of the reflection portion 23 that form the second passage hole 23*b* and an inclined surface continued from them are formed as second reflection surfaces 25 and 25, respectively.

In the reflector 11, guiding portions 26 and 26 are provided on the rear side of the reflecting protrusions 22 and 22, respectively. The guiding portion 26 is formed in a shape opened upward and rearward. The inner surfaces of the guiding portions 26 and 26 are constituted by three surfaces, respectively, that is, constituted by first guiding inclined surfaces 26*a* and 26*a* at the center in the left-right direction, second guiding inclined surfaces 26*b* and 26*b* on the outer side in the left-right direction, and third guiding inclined surfaces 26*c* and 26*c* on the inner side in the left-right direction. An opening of the upper end of the guiding portion 26 is formed as an intake opening 26*d*.

The first guiding inclined surfaces 26*a* and 26*a* are inclined so as to be displaced rearward as they go downward, the second guiding inclined surfaces 26*b* and 26*b* are inclined so as to be close from each other in the left-right direction as they go downward, and the third guiding inclined surfaces 26*c* and 26*c* are inclined so as to be close from each other in the left-right direction as they go downward.

Both left and right end portions of the base surface portion 21 of the reflector 11 are attached to the attaching portions 14 and 14 of the heat sink 9 from the front side by screwing, respectively. In the state where the reflector 11 is attached to the heat sink 9, the base surface portion 21 and the reflection portion 23 are brought closer to the circuit board 10 from the front side, each of the light sources 20, 20, . . . for low beam is positioned immediately behind the first passage hole 23*a*, and each of the light sources 20, 20, . . . for high beam is positioned immediately behind the second passage hole 23*b*.

As described above, the base surface portion 21 and the guiding portion 23 of the reflector 11 are brought closer to the circuit board 10 from the front side, and the first guiding inclined surfaces 26*a* and 26*a* become closer to the light sources 20, 20, . . . in the front-rear direction as they go downward, both the second guiding inclined surfaces 26*b* and 26*b* and the third guiding inclined surfaces 26*c* and 26*c* become closer to the light sources 20, 20, . . . in the left-right direction as they go downward.

The protector 12 is formed, for example, by bending a plate-shaped metal material into a predetermined shape. The protector 12 is constituted by a base portion 12*a* directed in the front-rear direction and horizontally long, fastening portions 12*b* and 12*b* protruding upward from both left and right end portions of the base portion 12*a*, respectively, a first light shielding portion 12*c* inclined forward from the base portion 12*a* and protruding downward, and bending forward with respect to the base portion 12*a*, and second light shielding portions 12*d* and 12*d* protruding forward from end portions of the fastening portions 12*b* and 12*b* on the inner side in the left-right direction. The fastening portions 12*b* and 12*b* of the protector 12 are attached to the attaching portions 14 and 14 of the heat sink 9 from the front side.

Meanwhile, in the vehicle lamp 1, the base surface portion 21 of the reflector 11, the fastening portions 12*b* and 12*b* of the protector 12, and the leg portions 7*b* and 7*b* of the lens holder 7 are attached in the order from the front side to the attaching portions 14 and 14 of the heat sink 9 from the front side by so-called being fixed together, for example, by screwing.

Figure 2:
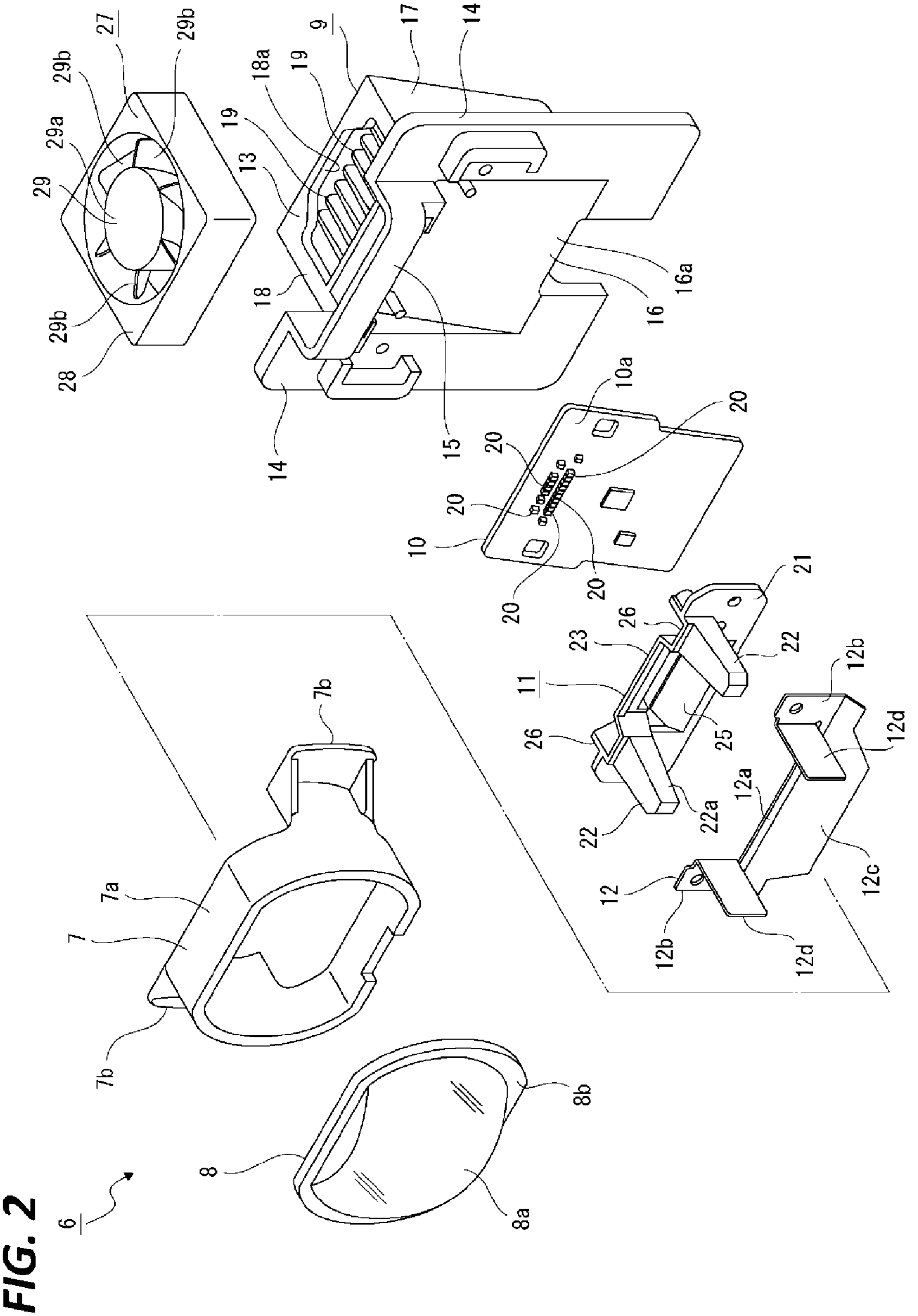
FIG. 2 is an exploded perspective view of a lamp unit.

A cooling fan 27 is attached to the heat radiating portion 13 of the heat sink 9, for example, by screwing (see FIGS. 1 and 2).

The cooling fan 27 includes a case portion 28 having a substantially rectangular outer shape, and a rotation driving unit 29 rotatably disposed inside the case portion 28. The rotation driving unit 29 includes a shaft portion 29*a* having an axial direction in the vertical direction and a plurality of wings 29*b*, 29*b*, . . . respectively protruding from an outer periphery surface of the shaft portion 29*a*.

Figure 5:
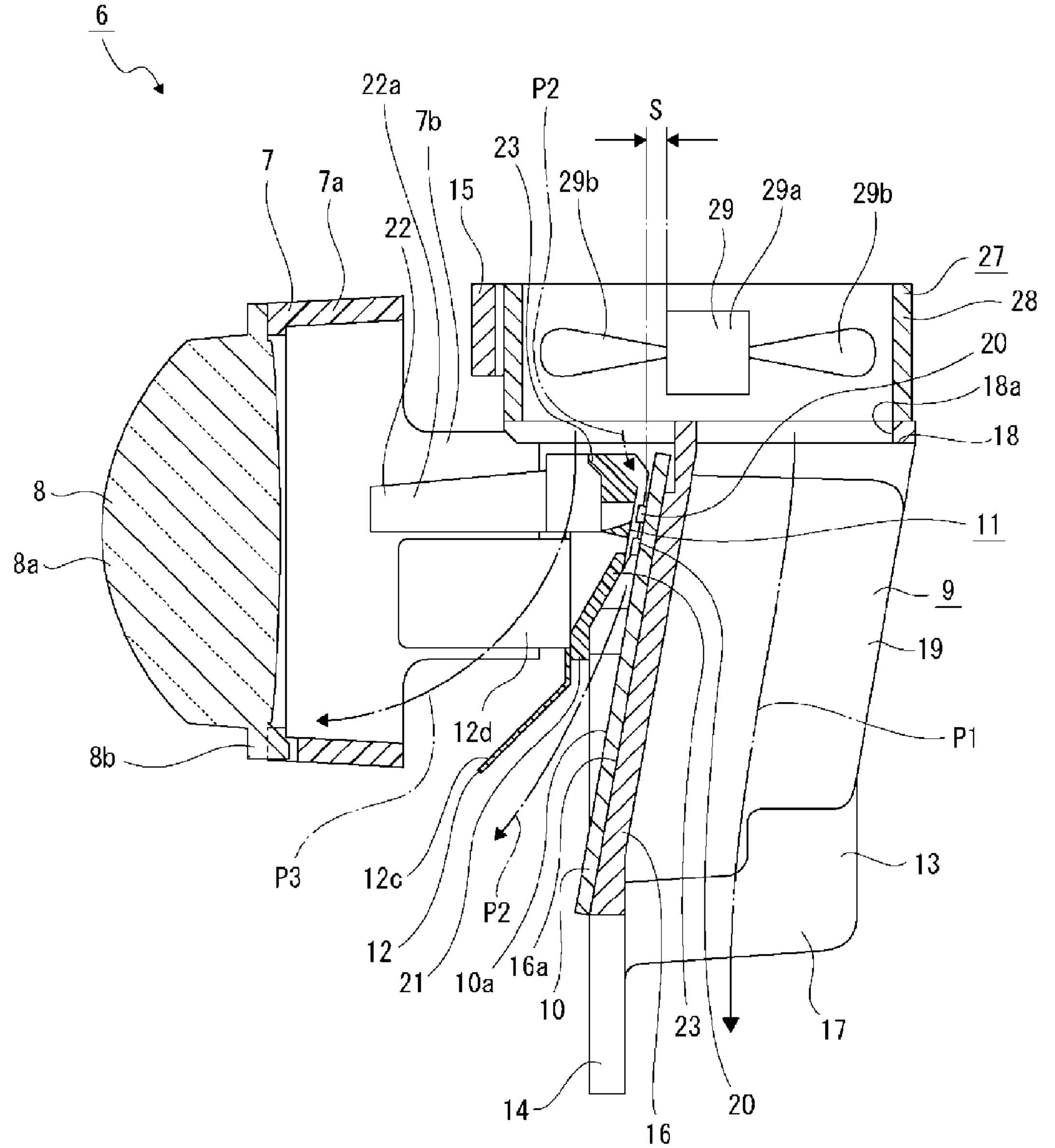
FIG. 5 is a cross-sectional view illustrating paths of cooling air.

The case portion 28 of the cooling fan 27 is attached to the upper surface portion 18 of the heat radiating portion 13 from above, and is positioned immediately behind the bridge portion 15 by being attached to the upper surface portion 18. In the state where the cooling fan 27 is attached to the heat radiating portion 13, the rotation driving unit 29 is disposed at a position spanning the front surface portion 16 of the heat sink 9 in the front-rear direction, and the shaft portion 29*a* (rotating axis 29*c*) is positioned behind from the light sources 20, 20, . . . mounted on the circuit board 10 (see FIG. 5). Therefore, a constant space S is formed between the shaft portion 29*a* and the light source 20. Meanwhile, the front end of the shaft portion 29*a* and the rear end of the light source 20 may be aligned with each other. In this case, the space S is 0.

Further, as described above, the circuit board 10 is inclined rearwardly downward with respect to the vertical direction according to the inclination state of the front surface portion 16, and the light source mounting surface 10*a* is disposed in a state of being inclined in a direction toward the cooling fan 27 side with with respect to the vertical direction.

In the vehicle lamp 1 configured as described above, when light is emitted forward by driving the light sources 20, 20, . . . , the emitted light is transmitted through the projection lens 8 and is irradiated forward.

At this time, the light emitted from the light source 20 for low beam passes through the first passage hole 23*a* of the reflection portion 23 and is reflected by the first reflection surfaces 24 and 24 and the side reflection surfaces 22*a* and 22*a*, and then is irradiated forward in a state where the light distribution control is performed. Meanwhile, the light emitted from the light source 20 for high beam passes through the second passage hole 23*b* of the reflection portion 23 and is reflected by the second reflection surfaces 25 and 25, and then is irradiated forward in a state where the light distribution control is performed.

Further, in the vehicle, sunlight may be transmitted through the projection lens 8 and incident on the inside of the lamp unit 6 depending on the position of the sun with respect to the vehicle lamp 1, but the incident sunlight is shielded by the first light shielding portion 12*c* and the second light shielding portions 12*d* and 12*d* of the protector 12. Therefore, each part of the lamp unit 6, especially, the part made of a resin material is prevented from being melted due to the incidence of sunlight. In particular, the first light shielding portion 12*c* is bent to the projection lens 8 side with respect to the base portion 12*a* so as to be positioned to be close to the projection lens 8, and thus, the first light shielding portion 12*c* has a high shielding property against sunlight that is transmitted through the projection lens 8 and is incident on the inside of the lamp unit 6.

When the light sources 20, 20, . . . described above are driven, heat is generated from the light sources 20, 20, . . . or electronic parts or each circuit pattern of the circuit board 10. The heat generated by the light source 20 or the like is transferred to the heat sink 9 except for a part, and is released from each part of the heat sink 9, especially from the fin portions 19, 19, . . . .

At this time, the cooling fan 27 is in a driving state and the rotation driving unit 29 is rotated. Cooling air generated by the rotation of the rotation driving unit 29 passes through the introducing hole 18*a* of the heat radiating portion 13 and flows downward along the fin portions 19, 19, . . . in a first path P1 (see FIG. 5). Therefore, the cooling air is blown to the heat radiating portion 13, especially to the fin portions 19, 19, . . . , and a high heat radiation property of the heat sink 9 is secured.

Meanwhile, a part of the heat generated by the light source 20 or the like is released to the space of the lamp chamber 5 on the front side of the light source mounting surface 10*a* or is transferred to the reflector 11 made of a metal material having high thermal conductivity and then released from the reflector 11.

At this time, the cooling fan 27 is in the driving state and the rotation driving unit 29 is rotated. The cooling air generated by the rotation of the rotation driving unit 29 passes from the intake opening 26*d* through a gap between the reflector 11 and the circuit board 10 and is blown to the light sources 20, 20, . . . , and flows downward in a second path P2. Therefore, the heat released to the space of the lamp chamber 5 on the front side of the light source mounting surface 10*a* is transferred downward by the cooling air flowing along the light sources 20, 20, . . . , and a high heat radiation property with respect to the heat released from the light source 20 or the like to the space of the lamp chamber 5 on the front side is secured.

As described above, the cooling air generated by the rotation of the rotation driving unit 29 is taken in from the intake opening 26*d* and flows toward the light sources 20, 20, . . . .

Therefore, since the cooling air generated by the cooling fan 27 is taken in from the intake opening 26*d* formed in the reflector 11 and is directed toward the light sources 20, 20, . . . , it is not necessary to provide a dedicated member separate from the reflector 11 for flowing the cooling air toward the light sources 20, 20, . . . , and the temperature rise of the light sources 20, 20, . . . may be reliably suppressed after reducing the number of parts and simplifying the structure.

Further, the reflector 11 includes the first guiding inclined surfaces 26*a* and 26*a*, the second guiding inclined surfaces 26*b* and 26*b*, and the third guiding surfaces 26*c* and 26*c* that induce the cooling air taken in from the intake opening 26*d*. The first guiding inclined surfaces 26*a* and 26*a*, the second guiding inclined surfaces 26*b* and 26*b*, and the third guiding surfaces 26*c* and 26*c* are inclined to be closer to the light sources 20, 20, . . . as the distance from the cooling fan 27 in the vertical direction increases.

Therefore, the cooling air intensively flows along the light sources 20, 20, . . . , and the cooling efficiency for the light sources 20, 20, . . . may be improved.

Further, the circuit board 10 is inclined rearwardly downward with respect to the vertical direction according to the inclination state of the front surface portion 16, and the light source mounting surface 10*a* is disposed in a state of being inclined in a direction toward the cooling fan 27 side with with respect to the vertical direction.

Therefore, the cooling air generated by the cooling fan 27 may easily flow along the light sources 20, 20, . . . , and the cooling efficiency for the light sources 20, 20, . . . may be further improved.

Further, when the light sources 20, 20, . . . are driven, the cooling air generated by the rotation of the rotation driving unit 29 passes through the gap between the reflector 11 and the circuit board 10 and flows downward in the second path P2, and passes through the front surface side of the reflector 11 and flows downward in a third path P3. Therefore, the cooling air is blown to both front and rear surfaces of the reflector 11, and thus, a high heat radiation property of the reflector 11 is secured.

Meanwhile, the cooling air flowing downward in the third path P3 flows from the front surface side of the reflector 11 along the first light shielding portion 12*c* of the protector 12. At this time, the first light shielding portion 12*c* is bent forward with respect to the base portion 12*a* and is inclined in a direction that becomes closer to the lower end portion of the projection lens 8 as it goes downward. Therefore, in the third path P3, the cooling air flowing along the first light shielding portion 12*c* flows toward the lower end portion of the attached portion 8*b* of the projection lens 8.

As described above, the lower end portion of the attached portion 8*b* corresponds to the gate position at the time of injection molding, and thus, there is a possibility that residual strain may remain and it may be a portion that is likely to be deformed by heat. However, the cooling air flowing along the first light shielding portion 12*c* in the third path P3 is blown to the lower end portion of the attached portion 8*b*.

Therefore, the lower end portion of the attached portion 8*b* is cooled by the cooling air, and thus, even in a case where residual strain remains in the lower end portion of the attached portion 8*b* and it is likely to be deformed by heat, it is possible to prevent the deformation of the lower end portion of the attached portion 8*b*.

As described above, since the first light shielding portion 12*c* of the protector 12 is provided as a guide portion that guides the cooling air toward the projection lens 8, the cooling air may be guided toward the projection lens 8 by the first light shielding portion 12*c* of the protector 12, and it is possible to promote the functionality of the protector 12, and then, the deformation of the projection lens 8 due to the heat may be prevented.

As described above, in the vehicle lamp 1, the circuit board 10 to which the light source 20 is mounted, the heat sink 9 including the front surface 16*a* to which the light source 20 is attached and releasing the heat generated when the light source 20 is driven, and the cooling fan 27 disposed above the circuit board 10 and the heat sink 9, and the cooling air generated by the cooling fan 27 flows along the heat sink 9 and the light source 20.

Therefore, since the cooling air generated by the cooling fan 27 disposed above the circuit board 10 and the heat sink 9 flows along the heat sink 9 and the circuit board 10 attached to the front surface 16*a* of the heat sink 9, it is possible to promote the miniaturization in the front-rear direction, and then to improve the cooling performance for the light source 20.

Meanwhile, in the above, an example in which the cooling fan 27 is disposed above the circuit board 10 and the heat sink 9, and the cooling air by the cooling fan 27 flows downward from above has been described. However, on the contrary, it is possible to configure such that air of the cooling fan 27 is sucked from below by the rotation of the rotation driving unit 29, and is blown upward, and the cooling air may flow upward from below along the heat sink 9 and the light source 20.

Further, the cooling fan 27 may be disposed below the circuit board 10 and the heat sink 9, and the cooling air may flow along the heat sink 9 and the light source 20. In this case, the cooling air may flow upward from below by the cooling fan 27, or the cooling air may flow downward from above by the cooling fan 27.

However, when the cooling fan 27 is disposed below the circuit board 10 and the heat sink 9, in order to make the cooling air easy to flow along the light sources 20, 20, . . . , the circuit board 10 may be disposed in a state of being inclined forwardly downward with respect to the vertical direction.

Further, in the vehicle lamp 1, the cooling fan 27 is provided with the shaft portion 29*a* and a plurality of wings 29*b*, and the shaft portion 29*a* is positioned to be closer to the heat sink 9 side than the light source 20 in the front-rear direction.

Therefore, since the wings 29*b* are positioned above or below the light source 20, the amount of the amount of the cooling air flowing along the light source 20 increases, and the cooling performance for the heat generated when the light source 20 is driven may be improved.

Further, the reflector 11 is made of a metal material and is attached to the heat sink 9.

Therefore, since the heat generated when the light sources 20, 20, . . . are driven is transferred to both the heat sink 9 and the reflector 11, the heat radiation from the reflector 11 in addition to the heat radiation from the heat sink 9 may further improve the cooling efficiency.

Meanwhile, the example in which the vehicle lamp 1 is a vehicle headlamp has been described in the above, the vehicle lamp 1 may be another vehicle lamp other than the vehicle headlamp, and may be a vehicle lamp that irradiates light backward in addition to a vehicle lamp that irradiates light forward.

In a case of the vehicle lamp that irradiates light backward, the circuit board 10 is attached to the rear surface of the heat sink 9, the cooling fan 27 is disposed above or below the circuit board 10 and the heat sink 9, and the cooling air generated by the cooling fan 27 flows along the heat sink 9 and the light source 20.

DESCRIPTION OF SYMBOLS

1: vehicle lamp
9: heat sink
10: circuit board
11: reflector
12: protector
12*c*: first light shielding portion
16*a*: front surface
20: light source
26*a*: first guiding inclined surface
26*b*: second guiding inclined surface
26*c*: third guiding inclined surface
26*d*: intake opening
27: cooling fan
29*a*: shaft portion
29*b*: wing

What is claimed is:

1. A vehicle lamp comprising:
a circuit board on which a light source is mounted;
a heat sink having a front surface or a rear surface to which the circuit board is attached and configured to release heat generated when the light source is driven; and
a cooling fan disposed above or below the circuit board and the heat sink,
wherein a first part of cooling air generated by the cooling fan flows along the heat sink and a second part of the cooling air generated by the cooling fan flows along the light source,
wherein a reflector is provided to reflect light emitted from the light source,
the reflector includes an intake opening that is positioned below or above the cooling fan and takes in the cooling air generated by the cooling fan, and
the cooling air taken in from the intake opening flows toward the light source.

2. The vehicle lamp according to claim 1, wherein the cooling fan is provided with a rotation shaft and a plurality of wings, and
the rotation shaft is positioned closer to the heat sink than the light source in a direction from the light source to the heat sink.

3. A vehicle lamp comprising:
a circuit board on which a light source is mounted;
a heat sink having a front surface or a rear surface to which the circuit board is attached and configured to release heat generated when the light source is driven; and
a cooling fan disposed above or below the circuit board and the heat sink,
wherein cooling air generated by the cooling fan flows along the heat sink and the light source,
wherein a reflector is provided to reflect light emitted from the light source,
the reflector includes an intake opening that is positioned below or above the cooling fan and takes in the cooling air generated by the cooling fan, and
the cooling air taken in from the intake opening flows toward the light source,
wherein the reflector has a guiding inclined surface that guides the cooling air taken in from the intake opening, and
the guiding inclined surface is inclined to be close to the light source as a distance from the cooling fan in a vertical direction increases.

4. The vehicle lamp according to claim 1, wherein the reflector is made of a metal material and is attached to the heat sink.

5. A vehicle lamp comprising:

a circuit board on which a light source is mounted;

a heat sink having a front surface or a rear surface to which the circuit board is attached and configured to release heat generated when the light source is driven; and a cooling fan disposed above or below the circuit board and the heat sink, wherein cooling air generated by the cooling fan flows along the heat sink and the light source, wherein a surface of the circuit board on which the light source is mounted is formed as a light source mounting surface, and the circuit board is disposed in a state where the light source mounting surface is inclined in a direction toward the cooling fan with respect to the vertical direction.

6. The vehicle lamp according to claim 1, further comprising:

a projection lens configured to control the light emitted from the light source; and a protector including a light shield that shields sunlight incident through the projection lens, wherein the light shield is provided as a guide that guides the cooling air toward the projection lens.

7. The vehicle lamp of according to claim 1, wherein the first part of the cooling air flows through a first space proximate to the heat sink and the second part of the cooling air flows through a second space proximate to the light source.

* * * * *